UNITED STATES PATENT OFFICE 2,681,926

DICHLORODIAMINOSTILBENEDISULFONIC ACIDS

Wyvona A. Lane, Washington, D. C., and Delton W. Hein, Somerville, N. J., assignors to American Cyanamid Company, New York, N. Y., a corporation of Maine No Drawing. Application July 17, 1951, Serial No. 237,305

6 Claims. (Cl. 260—505)

The present invention relates to a new class of stilbene derivatives. More particularly it is concerned with dihalogenostilbene disulfonic acids disulfonates containing the nucleus

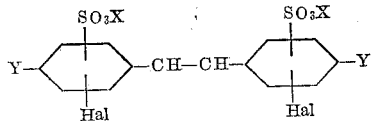

wherein X is hydrogen or a salt-forming radical, usually an ammonium or alkali metal radical; Y is a nitro, azo, azoxy or amino radical; and Hal is a halogen radical, preferably chlorine.

These compounds are variously useful. They are of particular interest in the preparation of dyestuffs and brightening agents. The latter have been the subject of an increasing industrial demand for various uses, for example, in the whitening of or the brightening of colored effects on cotton, linen, regenerated cellulose, paper, leather, wool, silk, nylon and the like. The invention contemplates both the compounds per se and the preparation thereof.

Compounds of the present invention can be prepared by reacting a nitrochlorotoluene with an alkali hypochlorite to form a dinitrodichlorostilbene. The sulfonate radicals, essential to insure stability and fiber affinity in the ultimate product, may be introduced before or after the formation of the stilbene nucleus. By strong reduction, as for example with acid and powdered metal, the nitro groups are converted to amino groups. These latter are perhaps the most useful commercial forms of the compounds of the present invention.

In carrying out the stilbene formation prior to sulfonation, a selected unsulfonated nitrochlorotoluene is converted by the hypochlorite treatment to a dinitrodichlorostilbene. This is followed by reduction to a diaminodichlorostilbene, and finally by sulfonation with strong sulfuric or chlorosulfonic acid. The amino groups may then be converted by standard procedures to azo or azoxy groups.

This procedure is most useful with the amino compounds. Where the nitro, azo or azoxy compounds are wanted, it is usually simpler to start with a sulfonated nitrotoluene, either as the free acid or as a salt or ester, for example, the phenyl ester. This is treated with the hypochlorite to form the dinitro stilbene. An alkaline reduction with a mild reducing agent such as glucose or its equivalent is then used to convert the nitro radicals directly to azo and azoxy groups, or a stronger acid reduction will produce the amino groups.

These dichlorodiaminostilbenedisulfonic acids are variously useful. For instance, they are readily diazotized and coupled with coupling components to give azo dyes of varied shades and good working and fastness properties. More important, they can be reacted with acyl halides, including aroyl and triazinyl halides, to give fluorescent brighteners of excellent properties, particularly with respect to hypochlorite fastness and freedom from the tendency to discolor fabrics. These brighteners form the subject matter of the co-pending application of Hein and Lane for U. S. Letters Patent, Serial No. 237,298, filed of even date.

While it is generally convenient to isolate the compounds of the present invention as free acids, it is sometimes preferable to prepare the alkali metal salts instead, which is readily done by conventional means. The free acids and their water soluble salts, including ammonium salts as well as metal salts, may be used interchangeably and are considered equivalents.

This invention is further illustrated by the following examples. All parts are by weight and temperatures are in degrees C., unless otherwise specified.

Example 1

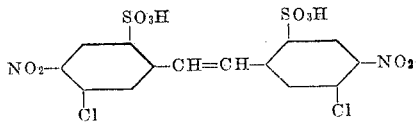

200 parts of m-chlorotoluene is added gradually with stirring to 600 parts of 100% sulfuric acid, the temperature being kept not above 70° C. Completion of the sulfonation is indicated by formation of a clear solution when a few drops of the reaction mixture is diluted with water. The solution is then cooled and treated slowly with 168 parts of 89% nitric acid at a temperature between 0° C. and 5° C. The mixture is then allowed to come to room temperature. It is drowned in ice to the volume of 4000 parts of water and salted with 500 parts of sodium chloride. The slurry of product is filtered, washed with 20% sodium chloride solution, and dried, giving a good yield of sodium 5-chloro-4-nitrotoluene-2-sulfonate.

A solution of 22.8 parts of the product thus prepared, in 400 parts of water and 53 parts of 30% sodium hydroxide solution, is treated with stirring at 60° C. with 100 parts by volume of sodium hypochlorite solution containing 7% by weight active chlorine. Stirring is continued until reaction is complete as shown by disappearance of color in a starch iodide test. The resulting sodium 5,5'-dichloro-4,4'-dinitrostilbene-2,2'-disulfonate is then salted out with 120 parts of sodium chloride. It is filtered, washed with 20% salt solution, and dried. It can be converted to the barium salt by treatment with barium chloride in aqueous solution, and thence to the free acid by treatment with sulfuric acid and filtration of the resulting barium sulfate, followed by acidification with hydrochloric acid.

*Example 2*

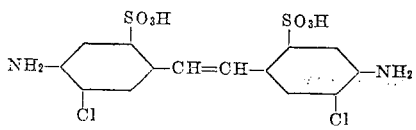

Reduction of the product of Example 1 to 5,5'-dichloro-4,4' - diaminostilbene - 2,2' - disulfonic acid is effected as follows: A solution of 22 parts of the dichlorodinitrostilbenedisulfonic acid in 100 parts of water is added gradually to 200 parts of boiling water under reflux, containing 100 parts of iron powder and 2 parts of acetic acid. Stirring and refluxing are continued for one and one-half hours after addition is complete. The mixture is cooled and neutralized with solid sodium carbonate. The iron sludge is removed by filtration and the product precipitated with hydrochloric acid. The product is washed with ice water and dried at 100° C.

It can be converted to the sodium salt, if desired, by neutralizing with aqueous sodium hydroxide or sodium carbonate and salting out of solution with sodium chloride.

A slurry of 4.83 parts of the above prepared product in 100 parts of water and 22 parts of 5N hydrochloric acid is chilled to 0–5° C. and tetrazotized in the normal way with N sodium nitrite. The resulting tetrazo is reacted with a slurry of 5.5 parts of Schaeffer's salt (pure basis) in 100 parts of water and 11.7 parts of soda ash. After stirring overnight, the product is filtered.

Similar couplings are made from beta-naphthol and 1-phenyl-3-methyl-5-pyrazolone. The products can be used as acid dyes, or they can be copperized in the ordinary way by refluxing in ammoniacal copper sulfate solution. The copper complexes give a dyeings of the following shades:

| Coupling Component | Shade |
|---|---|
| Schaeffer's salt | Reddish Blue. |
| Phenylmethylpyrazolone | Orange. |
| Beta-naphthol | Bordeaux. |

*Example 3*

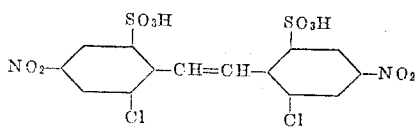

155 parts of 2-chloro-4-nitrotoluene is dissolved in 610 parts of 30% oleum, stirred at 75° C. for 2 hours, and drowned in 2700 parts of ice. The mixture is filtered with the aid of siliceous filter-aid and the product salted with 680 parts of salt. It is washed with 20% salt solution and dried at 100°.

150 parts of the resulting sodium 2-chloro-4-nitrotoluene-6-sulfonate and 150 parts of phosphorus pentachloride are refluxed for one hour with 150 parts of phosphorus oxychloride. The mixture is cooled and drowned in 3000 parts of ice and water. The product is filtered, washed, and dried.

92.8 parts of the above prepared 2-chloro-4-nitrotoluene-6-sulfonyl chloride is added gradually, below 20° C. with stirring, to a solution of 65 parts of phenol in 110 parts of pyridine. The mixture is stirred for three hours without further cooling and drowned in ice and water containing excess sodium hydroxide. The solid is filtered, dissolved in 880 parts of benzene, and washed successively with dilute alkali, dilute acid, and water. Evaporation of the benzene gives phenyl-2-chloro-4-nitrotoluene-6-sulfonate.

A rapid stream of oxygen is passed through a vigorously stirred solution of 240 parts of methanol and 5.0 parts of the above prepared phenyl-2-chloro-4-nitrotoluene-6-sulfonate. To this is then added 45 parts of 50% aqueous potassium hydroxide. The solution becomes deep blue-green, then orange-yellow. It is then filtered, acidified with 42 parts of concentrated hydrochloric acid and again filtered. The filtrate is evaporated to dryness and subjected to steam distillation to remove any phenol present. The product is treated with a N solution of cyclohexylamine hydrochloride, resulting in the deposition of the crystalline cyclohexylammonium salt of 6,6'-dichloro-4,4'-dinitrostilbene-2,2'-disulfonic acid.

*Example 4*

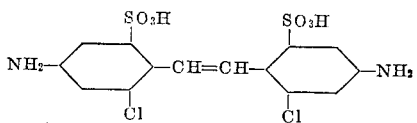

4.4 parts of the cyclohexylammonium salt of Example 3 is slurried in 50 parts of water, made alkaline with sodium carbonate solution, and freed of cyclohexylamine by steam distillation. The residual solution is gradually added to a stirred refluxing mixture of 20 parts of powdered iron, 100 parts of water, and 2 parts of concentrated hydrochloric acid. The mixture is stirred and refluxed until reduction is complete. It is then made alkaline with sodium or potassium carbonate and the iron sludge removed by filtration. The product is obtained in the form of its sodium or potassium salt by salting with sodium or potassium chloride, together with evaporation if necessary to remove excess water. To obtain the free acid, the filtrate from the iron sludge is acidified with concentrated hydrochloric acid and cooled. The resulting 6,6'-dichloro-4,4'-diaminostilbene-2,2'-disulfonic acid is filtered.

*Example 5*

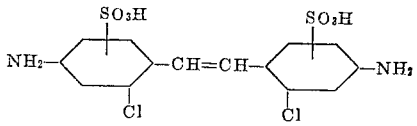

A mixture of 5.0 parts of 2,2'-dichloro-4,4'-dinitrostilbene and 20 parts of 70 to 72% sodium hydrosulfide in 200 parts of alcohol is stirred under reflux for 4 hours and then drowned in 3000 parts of water. The white product is filtered, washed with water, and air dried. A good yield of 2,2'-dichloro-4,4'-diaminostilbene is obtained. If desired, it may be purified by dissolving in alcohol and treating with gaseous hydrogen chloride to precipitate the dihydrochloride.

The disulfonic acid is prepared by heating 6.3 parts of 2,2'-dichloro-4,4'-diaminostilbene for one-half hour at 120–130° with 28.6 parts of 20% oleum. The reaction mixture is diluted with 120 parts of ice and filtered. The product is washed and dried at 100° C.

We claim:

1. A dyestuff intermediate selected from the group consisting of dihalogeno stilbenes and water soluble salts thereof having the formula

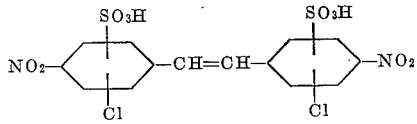

2. A dyestuff intermediate selected from the group consisting of dihalogeno stilbenes and water soluble salts thereof having the formula

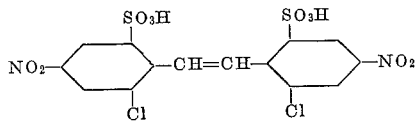

3. A dyestuff intermediate selected from the group consisting of dihalogeno stilbenes and water soluble salt thereof having the formula

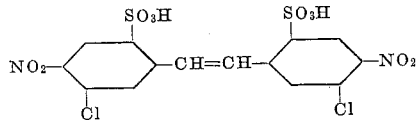

4. A dyestuff intermediate selected from the group consisting of dihalogeno stilbenes and water soluble salts thereof having the formula

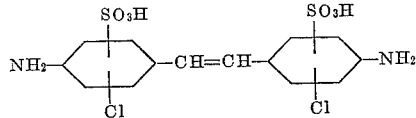

5. A dyestuff intermediate selected from the group consisting of dihalogeno stilbenes and water soluble salts thereof having the formula

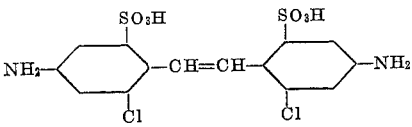

6. A dyestuff intermediate selected from the group consisting of dihalogeno stilbenes and water soluble salts thereof having the formula

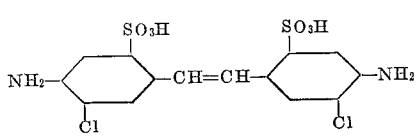

References Cited in the file of this patent

UNITED STATES PATENTS

| Number | Name | Date |
|---|---|---|
| 2,527,425 | Keller et al. | Oct. 24, 1950 |

FOREIGN PATENTS

| Number | Country | Date |
|---|---|---|
| 838,079 | France | Feb. 27, 1939 |
| 238,448 | Switzerland | July 15, 1945 |

OTHER REFERENCES

Ber-Deut. Chem. 46. 1235–1238 (1913).

Ruggli et al., Helvetica Chimica Acta, 9, (1926), pgs. 929–950.

Comptes Rendes 190–1198–1200 (1930).

Conant, "The Chemistry of Organic Compounds," (1939), pgs. 544 and 545.